(12) United States Patent
Sato

(10) Patent No.: US 6,625,668 B1
(45) Date of Patent: Sep. 23, 2003

(54) INFORMATION PROCESSING APPARATUS, DATA TRANSFER METHOD THEREFOR, AND PROVISION MEDIUM CONTAINING COMPUTER-READABLE PROGRAM TO BE EXECUTED BY THE IMAGE PROCESSING APPARATUS

(75) Inventor: Koichi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/436,873

(22) Filed: Nov. 9, 1999

(30) Foreign Application Priority Data

Nov. 10, 1998 (JP) ............................................ 10-319068

(51) Int. Cl.[7] ............................................... G06F 13/14
(52) U.S. Cl. ......................... 710/8; 709/221; 707/205; 717/11; 345/333
(58) Field of Search ........................... 710/8; 709/221; 707/205; 717/11; 345/333

(56) References Cited

U.S. PATENT DOCUMENTS

| | | | | |
|---|---|---|---|---|
| 5,940,074 A | * | 8/1999 | Britt, Jr. et al. | ............. 345/333 |
| 5,974,454 A | * | 10/1999 | Apfel et al. | ................. 709/221 |
| 6,125,372 A | * | 9/2000 | White | ......................... 707/205 |
| 6,324,693 B1 | * | 11/2001 | Brodersen et al. | ............. 717/11 |

* cited by examiner

*Primary Examiner*—Abdelmoniem Elamin
(74) *Attorney, Agent, or Firm*—Frommer Lawrence & Haug LLP; William S. Frommer; Samuel H. Megerditchian

(57) ABSTRACT

An information processing apparatus, which is used as a so-called "multichannel video server" that performs data recording or reproduced-data processing by controlling input/output processors to time-divisionally access a non-linearly accessible recording medium, includes a processor that performs processing based on a file transfer protocol. The information processing apparatus updates software for controlling internal processes by downloading updating software from an external personal computer connected to the information processing apparatus via an Ethernet connection. The information processing apparatus performs the various processes in accordance with the updated software. Even when the image processing apparatus is located at a physically far place from another information processing apparatus, its software can be easily updated.

6 Claims, 10 Drawing Sheets

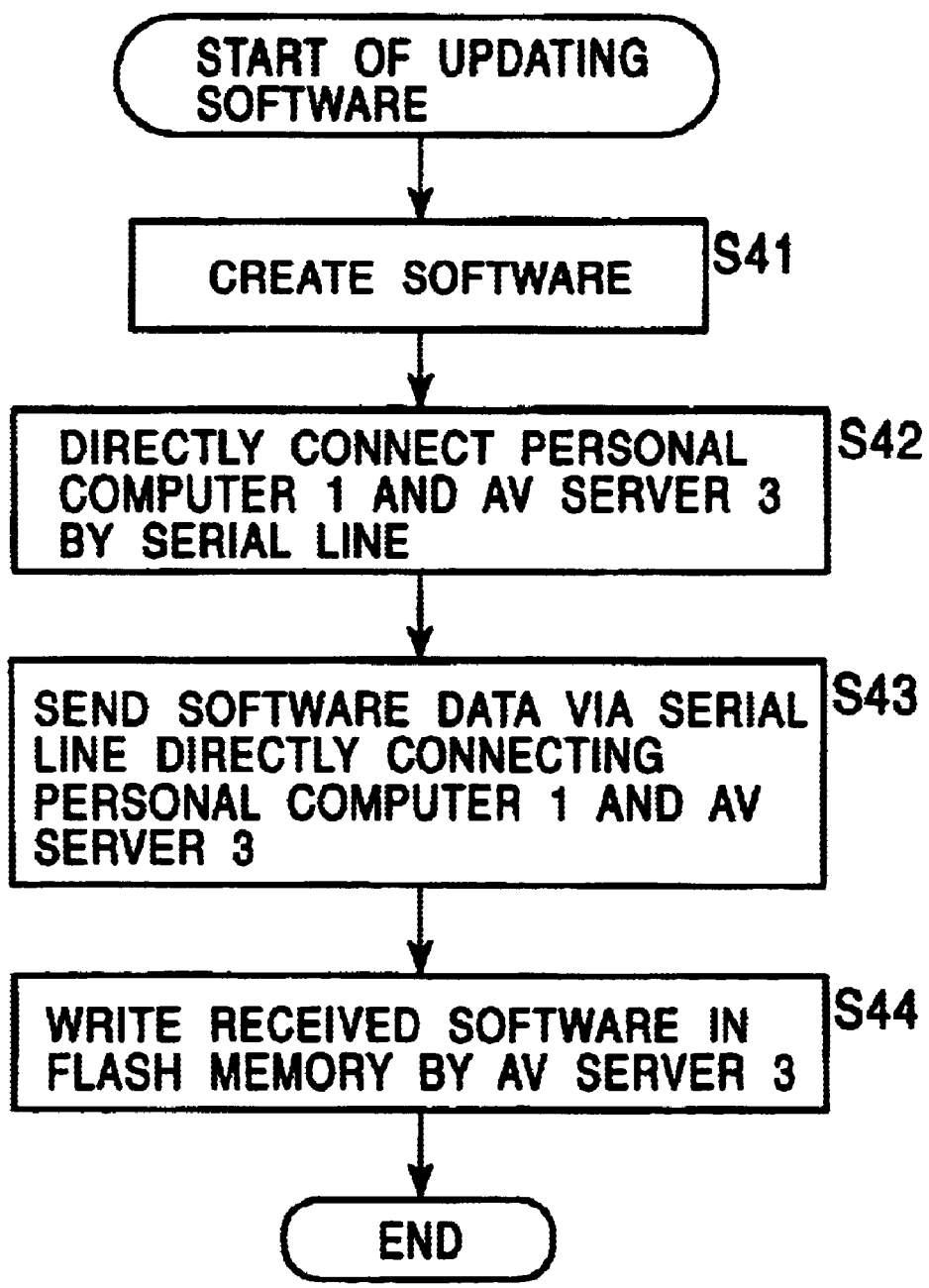

INFORMATION PROCESSING APPARATUS, DATA TRANSFER METHOD THEREFOR, AND PROVISION MEDIUM CONTAINING COMPUTER-READABLE PROGRAM TO BE EXECUTED BY THE IMAGE PROCESSING APPARATUS

BACKGROUND OF THE INVENTION

1. Field of the Invention

The present invention generally relates to information processing apparatuses and methods, and provision media therefor. In particular, the present invention relates to an information processing apparatus and method in which an information processing apparatus updates data stored in another information processing apparatus connected to a network by transmitting data via the network, and to a provision medium for the information processing apparatus.

2. Description of the Related Art

When software of a server (e.g., audio-visual (AV) server) is updated, or new software is installed in an AV server, a person who updates software ordinarily uses a read only memory (ROM) writer to write updating-software data in a ROM (e.g., flash memory), and goes to a place where the AV server is located in order to exchange the ROM of the AV server for the updated ROM.

Referring to the flowchart shown in FIG. 9, a process for updating software by using the ROM writer is described below.

In step S31, the person creates software for updating. In step S32, the person uses a ROM writer to write the created software in a ROM. In step S33, the person goes to a place where an AV server is located, and exchanges the ROM of the AV server for the ROM obtained in step S32. Using steps S31 to S33, the person can update the software of the AV server.

In another process for updating software, as shown in is FIG. 10, a person who performs updating installs updating software beforehand in a personal computer (or a workstation) 1 or the like, and moves the personal computer 1 to a place where an AV server 3 is located. The person connects the personal computer 1 and the AV server 3 by a serial line 2 (e.g., the RS232C interface), and installs the updating software from the personal computer 1 into the AV server 3.

Referring to the flowchart shown in FIG. 11, a process for updating software in the case where the personal computer 1 and the AV server 3 are connected by the serial line 2 is described below.

In step S41, the person creates updating software, and installs it in the personal computer 1. In step S42, the person moves the personal computer 1, in which the software created in step S41 is installed, to a place where the AV server 3 is located, and directly connects the personal computer 1 and the AV server 3 by the serial line 2.

In step S43, the person operates the personal computer 1 to transmit the data of the software installed in the personal computer 1 in step S42 to the AV server 3 via the serial line 2. In step S44, the AV server 3 writes the software data received from the personal computer 1 in a flash memory built into the AV server 3. Using steps S41 to S43, the person can update the software of the AV server 3.

In the above-described processes, unless the person goes to the place where the AV server 3 is located, the software of the AV server 3 cannot be updated. In addition, when the personal computer 1 is located far from the AV server 3, and the software of the AV server 3 is updated from the personal computer 1 by connecting the personal computer 1 and the AV server 3 to an Ethernet connection instead for the serial line 2, a problem occurs in that the firewall of the Ethernet connection blocks data transfer to make it impossible to update the software because a transfer protocol for the software of the AV server 3 is for a single use.

SUMMARY OF THE INVENTION

Accordingly, it is an object of the present invention to provide an information processing apparatus and method that easily updates software of a physically far information processing apparatus by using a network to transfer updating software to the far information processing apparatus, and to provide a provision medium for the information processing apparatus and method.

To this end, according to an aspect of the present invention, the foregoing object is achieved through provision of an information processing apparatus including a data recorder-reproducer including a nonlinearly accessible recording medium and a plurality of input/output processing means for recording, on the recording medium, first data including externally input video and/or audio data by accessing the recording medium in time slots assigned when the first data are input and for processing and outputting reproduced data to the exterior by accessing the recording medium in the time slots; and an information controller including a first storage means for storing second data controlling the data recorder-reproducer, the information controller connected to the data recorder-reproducer via a communication network, and a first control means performs control so that the second data stored in the first storage means are transferred based on a file transfer protocol to the data recorder-reproducer via the communication network. The data recorder-reproducer includes a second storage means for storing the second data transferred from the information controller, and a second control means for assigning each time slot to each input/output processing means and for controlling based on the second data stored in the second storage means the input/output processing means.

Preferably, the second control means controls each input/output processing means to record the first data on the nonlinearly accessible recording medium, and controls each input/output processing means to reproduce the first data recorded on the recording medium.

The nonlinearly accessible recording medium may be a redundant array of inexpensive disks (RAID) in which a plurality of hard disk drives including a plurality of hard disks are arranged in parallel.

According to another aspect of the present invention, the foregoing object is achieved through provision of a data transfer method for an information processing apparatus including a data recorder-reproducer for recording and/or reproducing first data including video and/or audio data by accessing a nonlinearly accessible recording medium in time slots to which a plurality of input/output means are assigned, and an information controller for storing second data controlling the data recorder-reproducer which is connected to the data recorder-reproducer via a communication network. The data transfer method includes a first step for transferring based on a file transfer protocol the second data stored in the information controller to the data recorder-reproducer via the communication network, a second step for storing the second data transferred in the first step in the data recorder-reproducer, and a third step for controlling based on the second data stored in the second step each input/output means in the data recorder-reproducer to record/reproduce the first data on/from the recording medium.

Preferably, the nonlinearly accessible recording medium is a RAID in which a plurality of hard disk drives including a plurality of hard disks are arranged in parallel.

According to a further aspect of the present invention, the foregoing object is achieved through provision of a provision medium containing a computer-readable program to be executed by an information processing apparatus including a data recorder-reproducer for recording and/or reproducing first data including video and/or audio data by accessing a nonlinearly accessible recording medium in time slots to which a plurality of input/output means are assigned, and an information controller for storing second data controlling the data recorder-reproducer which is connected to the data recorder-reproducer via a communication network. The computer-readable program includes a first step for transferring based on a file transfer protocol the second data stored in the information controller to the data recorder-reproducer via the communication network, a second step for storing the second data transferred in the first step in the data recorder-reproducer, and a third step for controlling based on the second data stored in the second step each input/output means in the data recorder-reproducer to record/reproduce the first data on/from the recording medium.

BRIEF DESCRIPTION OF THE DRAWINGS

FIG. 11 is a flowchart illustrating a conventional process for updating software by connecting a personal computer 1 and an AV server 3.

DESCRIPTION OF THE PREFERRED EMBODIMENTS

Figure 1:
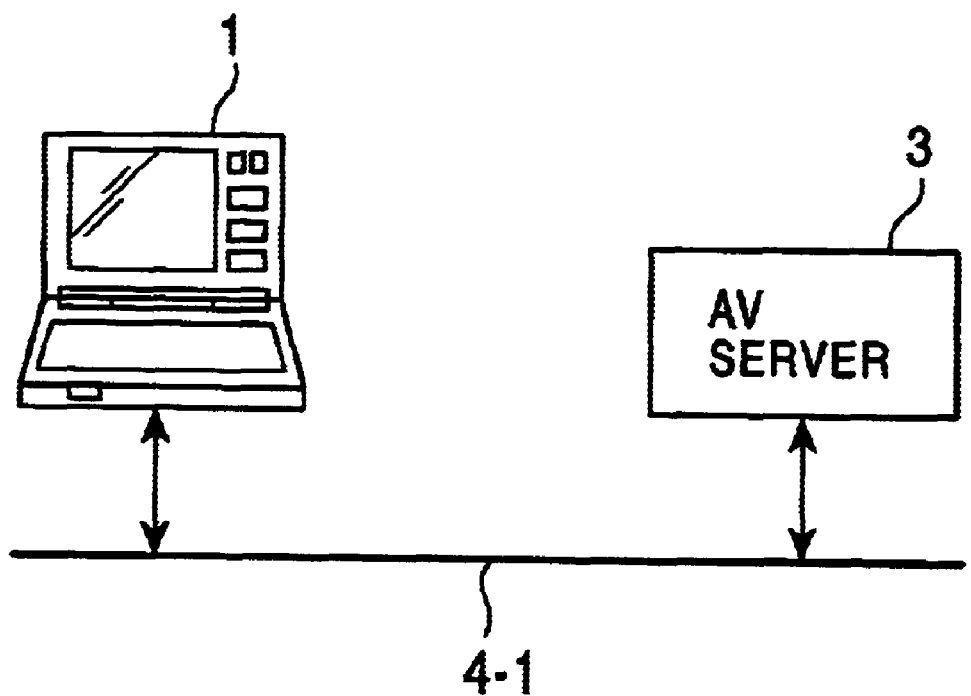
FIG. 1 is a block diagram showing an information processing apparatus according to an embodiment of the present invention.

Referring to FIG. 1 showing an information processing apparatus according to an embodiment of the present invention, a personal computer 1 and an AV server 3 are connected by, for example, an Ethernet connection 4-1 as a local area network, and they can perform data communication.

Figure 2:
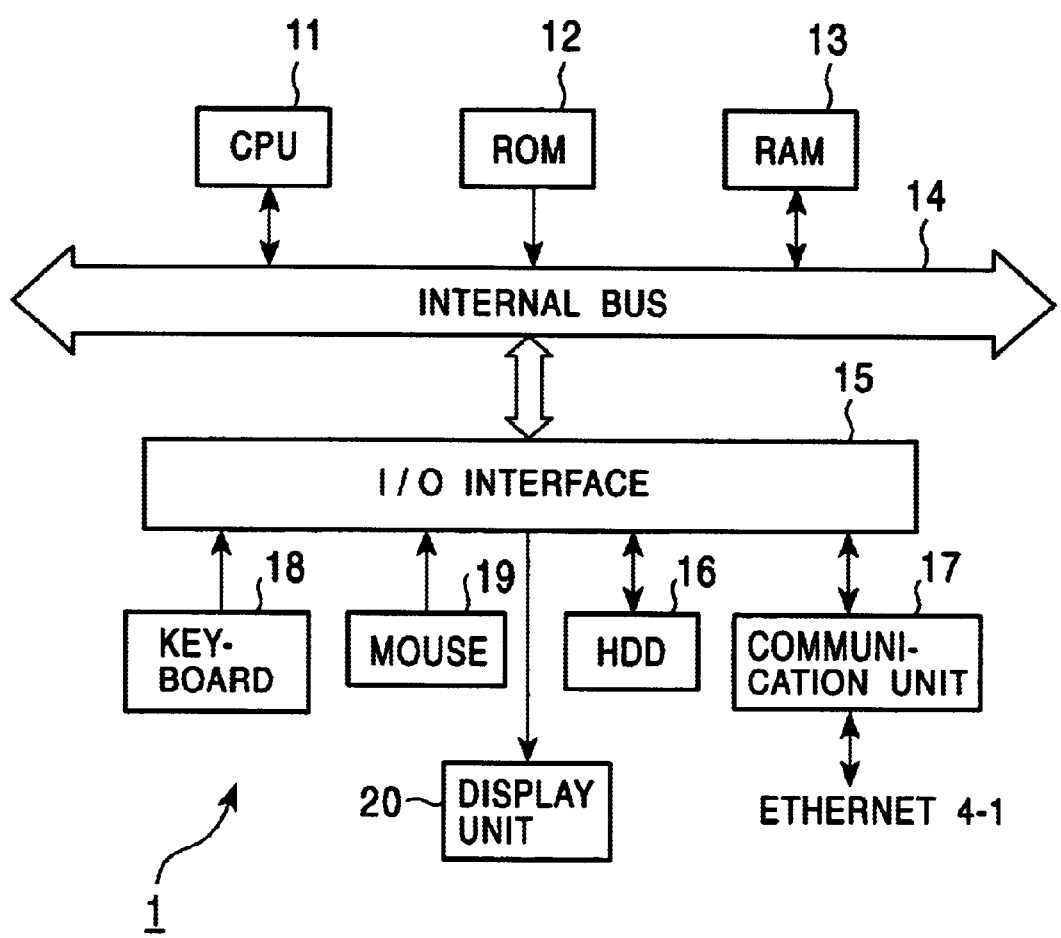
FIG. 2 is a block diagram showing the personal computer 1 shown in FIG. 1.

Referring to FIG. 2 showing the hardware configuration of the personal computer 1, a central processing unit (CPU) 11, a ROM 12, and a random access memory (RAM) 13 are connected to an internal bus 14. The internal bus 14 is also connected to an input/output (I/O) interface 15. The I/O interface 15 is connected to a hard disk drive (HDD) 16, a communication unit 17, a keyboard 18, a mouse 19, and a display unit 20.

The CPU 11 controls the functions of the personal computer 1, and executes various processes in accordance with programs stored in the ROM 12. The ROM 12 contains not only the various programs but also the program of an extended file transfer protocol (extended FTP). The extended FTP performs file transfer between network-connected units on a transmission control protocol (TCP). The program of the extended FTP causes the personal computer 1 to function as an FTP client on a network.

The RAM 13 stores data and programs required when the CPU 11 executes the various processes. The HDD 16 is an external storage unit in which a program for transmission to the AV server 3, etc., is stored. The communication unit 17 comprises, for example, a modem, and performs communication with an external unit (e.g., the AV server 3) via a communication network (e.g., the Ethernet connection 4-1). The keyboard 18 is operated when a user inputs from the exterior. The mouse 19 is operated when the user selects icons, etc., displayed on the display unit 20. The display unit 20 comprises a liquid crystal display (LCD) device, and displays predetermined images.

Figure 3:
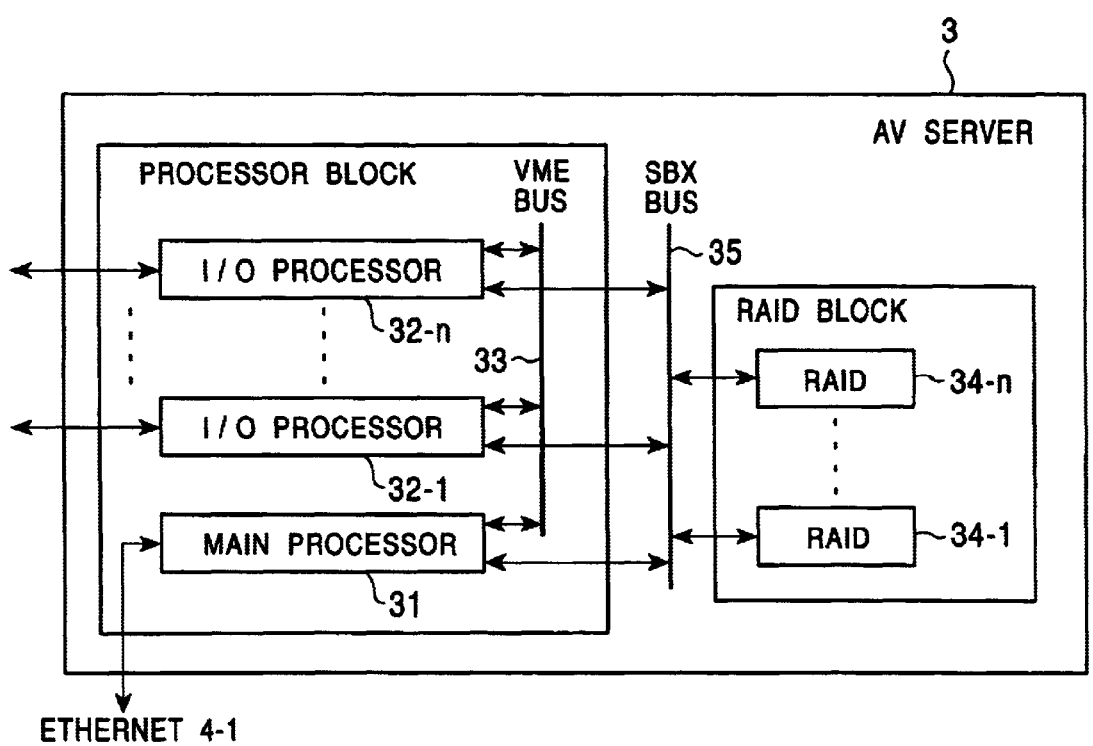
FIG. 3 is a block diagram showing the AV server 3 shown in FIG. 1.

FIG. 3 shows the entire structure of the AV server 3.

The AV server 3 includes a plurality of input/output (I/O) processors 32-1 to 32-n for processing audio and/or video data (hereinafter referred to as "AV data") externally input or output, a main processor 31 for controlling the I/O processors 32-1 to 32-n by using control data input via the Ethernet connection 4-1, a VERSA module European (VME) bus 33 connected between the main processor 31 and the I/O processors 32-1 to 32-n, redundant arrays of inexpensive disks (RAIDs) 34-1 to 34-n in which the AV data are stored in a plurality of hard disk drives connected in parallel, and a serial bus exchange (SBX) bus connected between the I/O processors 32-1 to 32-n and the RAIDs 34-1 to 34-n.

The I/O processors 32-1 to 32-n extract AV data from external data input in a transmission format such as a serial digital interface (standardized in SMPTE-259M) or a serial digital transfer interface. The I/O processors 32-1 to 32-n compress the AV data using a compression standard such as the moving-picture-experts-group standard or the joint-photographic-experts-group standard, as required, and outputs the compressed AV data to the RAIDs 34-1 to 34-n. When the reproduced data output from the RAIDs 34-1 to 34-n are compressed, the I/O processors 32-1 to 32-n decompress the data to generate data in the format of the above-described transmission format, and output the generated data.

The main processor 31 supplies a time-slot signal to the I/O processors 32-1 to 32-n via the VME bus 33. In other words, the I/O processors 32-1 to 32-n output the AV data processed (as described) based on the assigned times-lot signal to the RAIDs 34-1 to 34-n, and the reproduced AV data are input from the RAIDs 34-1 to 34-n to the I/O processors 32-1 to 32-n. The details are described below.

The time-slot signal adjusts the accessing of the I/O processors 32-1 to 32-n to the SBX bus 35. When each of the I/O processors 32-1 to 32-n freely accesses each of the RAIDs 34-1 to 34-n, data from each I/O processor or from each RAID butts each other in the SBX bus 35, which blocks data inputting and outputting. Accordingly, the type of access to the SBX bus 35 is executed by each I/O processor within each assigned time slot, whereby failure is corrected.

In each of the RAIDs 34-1 to 34-n, a so-called "array structure" of connecting a plurality of hard disk drives in parallel is employed. For example, by using the RAID 34-3 to store video signals, and using the RAID 34-1 to generate audio signals, the redundancy and reliability of stored data can be ensured.

Figure 4:
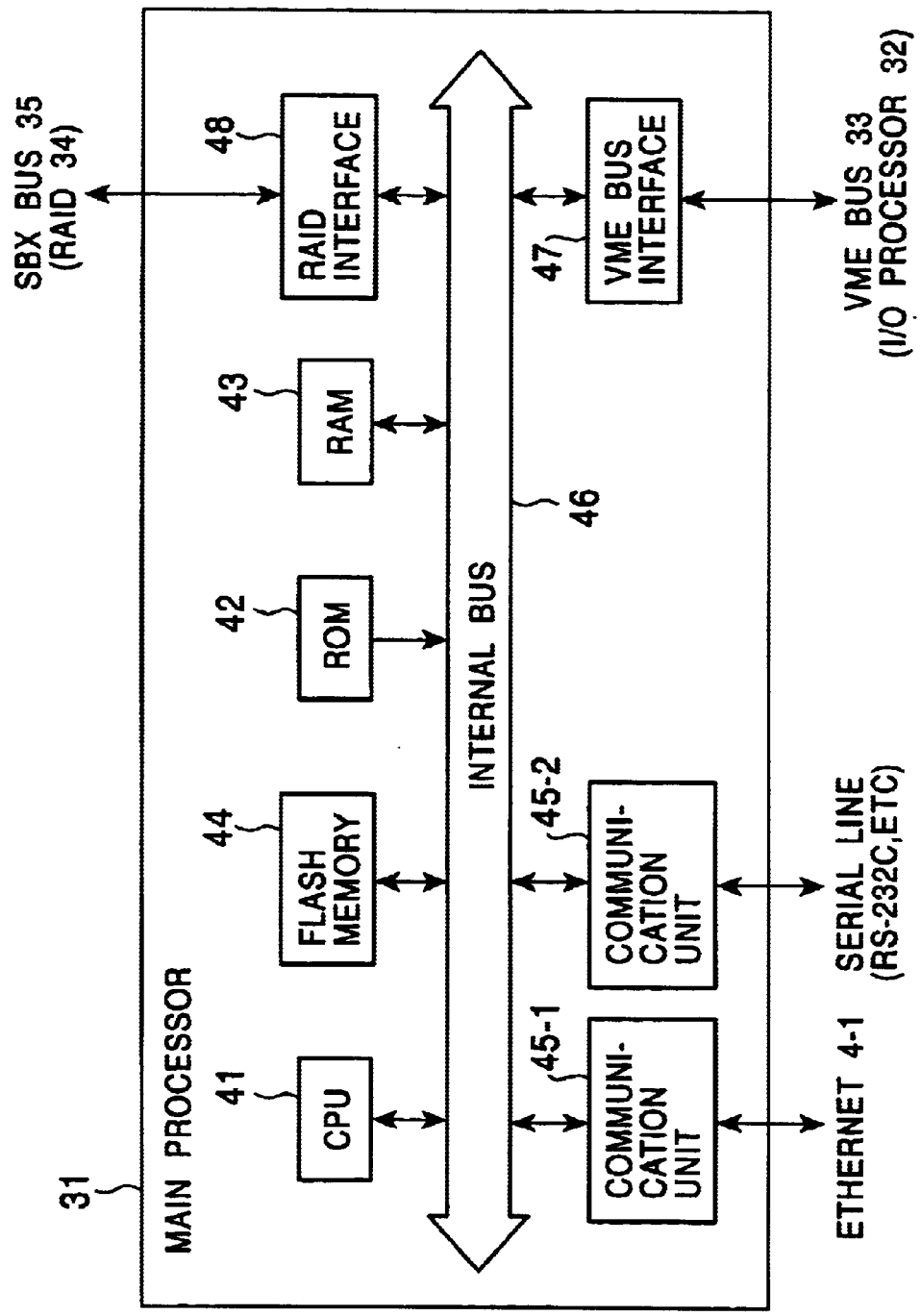
FIG. 4 is a block diagram showing the main processor 31 shown in FIG. 3.

Referring to FIG. 4 showing the hardware of the main processor 31, a CPU 41, a ROM 42, a RAM 43, a flash memory 44, a communication unit 45-1, and a communication unit 45-2 are connected to an internal bus 46 in the main processor 31. The internal bus 46 is also connected to a VME bus interface 47 and a RAID interface 48. The VME bus interface 47 is connected to the I/O processors 32-1 to 32-n via the VME bus 33. The RAID interface 48 is connected to RAIDs 34-1 to 34-n via the SBX bus 35.

The CPU 41, the ROM 42, and the RAM 43 have functions similar to those of the CPU 11, the ROM 12, and the RAM 13 in the personal computer 1 shown in FIG. 2. Accordingly, descriptions of them are omitted in this specification. The ROM 42 contains an extended FTP program. The extended FTP program causes the AV server 3 to function as an FTP server on the network. The flash memory 44 stores software data transferred from the personal computer 1, etc. The communication unit 45-1 comprises, for example, a modem, and performs communication with an external unit (e.g., the personal computer 1) via a communication network (e.g., the Ethernet connection 4-1). The communication unit 45-2 is identical in structure to the communication unit 45-1, and performs communication with an external unit (e.g., RS232C).

Figure 5:
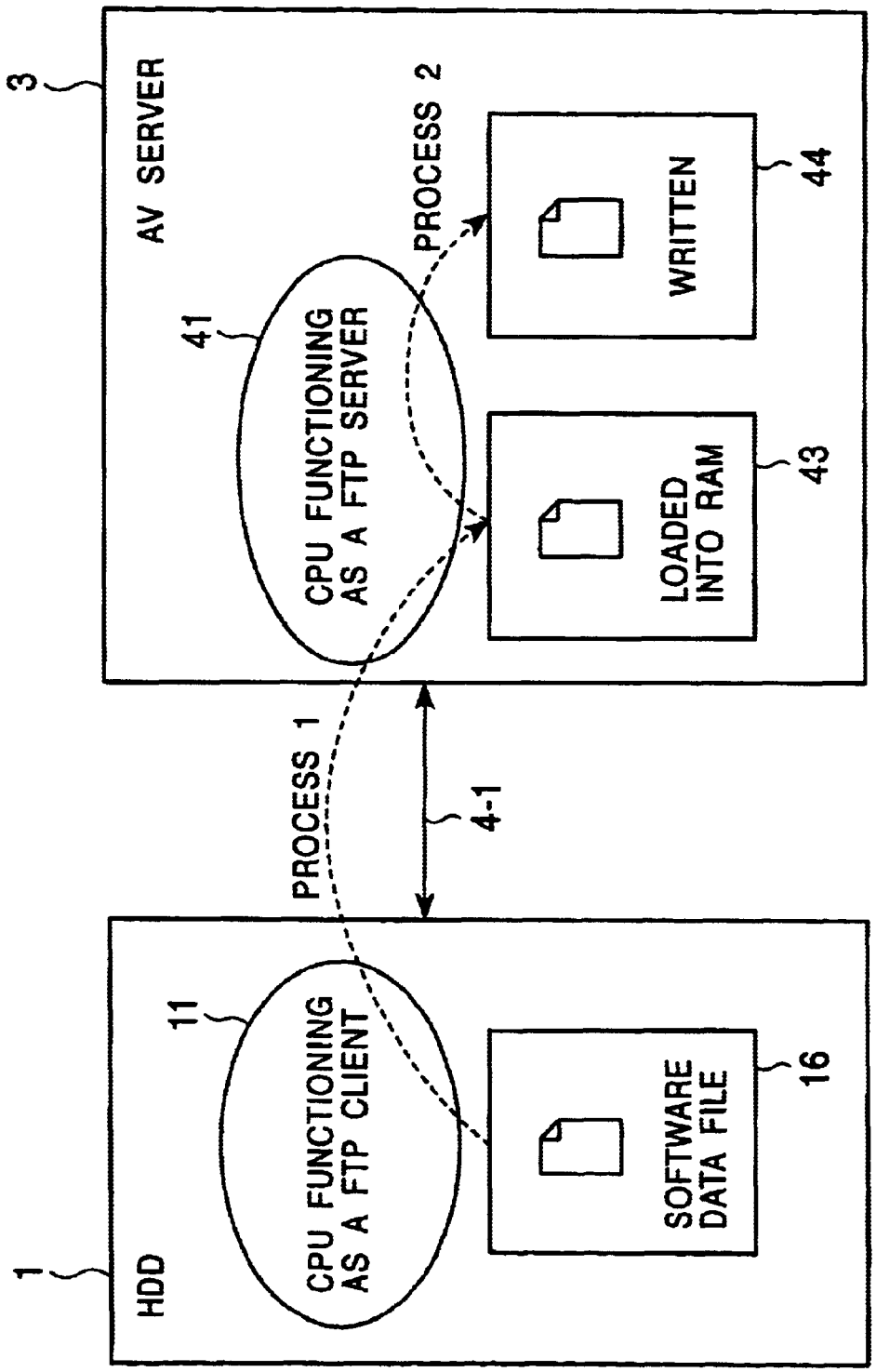
FIG. 5 is a drawing illustrating the flow of data when software updating is performed in the personal computer 1 and the AV server 3 shown in FIG. 1.

With reference to FIG. 5, the flow of software data between the personal computer 1 and the AV server 3 is described below.

In the personal computer 1, an HDD 16 stores the file of software data to be updated by the AV server 3. When a person who performs updating instructs transfer of the software data file stored in the HDD 16 of the personal computer 1 to the AV server 3 (the use of the personal computer 1 as a server and the AV server as a client is called "downloading" in the present invention), the CPU 11 of the personal computer 1 reads, based on its FTP client function corresponding to the extended FTP, the software data file from the HDD 16, and outputs the read file to the Ethernet connection 4-1 by controlling the communication unit 17.

The extended FTP is a protocol obtained by providing the request for comments (RFC) 959 "FTP" (as a base) with separate commands such as the reserving of resources for the downloading of software, and writing to a flash memory. Because the extended FTP has an FTP as a base, communication cannot be blocked by a firewall for a network.

The firewall is a network security protector. As one of famous firewall systems, "FireWall-1" of CHECK POINT Software Technology is known. This system is provided in a gateway system positioned at a point where the Internet and a user network are in contact, and enables application accessing from the exterior (such as electronic mail) and transparent accessing from the interior to the Internet.

In the AV server 3, the CPU 41 uses its FTP server function to load (write) software data input via the Internet into the RAM 43. This process corresponds to process 1 shown in FIG. 5. When the CPU 41 in the AV server 3 receives all software data from the personal computer 1, it writes the software data in the flash memory 44 at the time the personal computer 1 instructs writing to the flash memory 44. This process corresponds to process 2 shown in FIG. 5.

Figure 6:
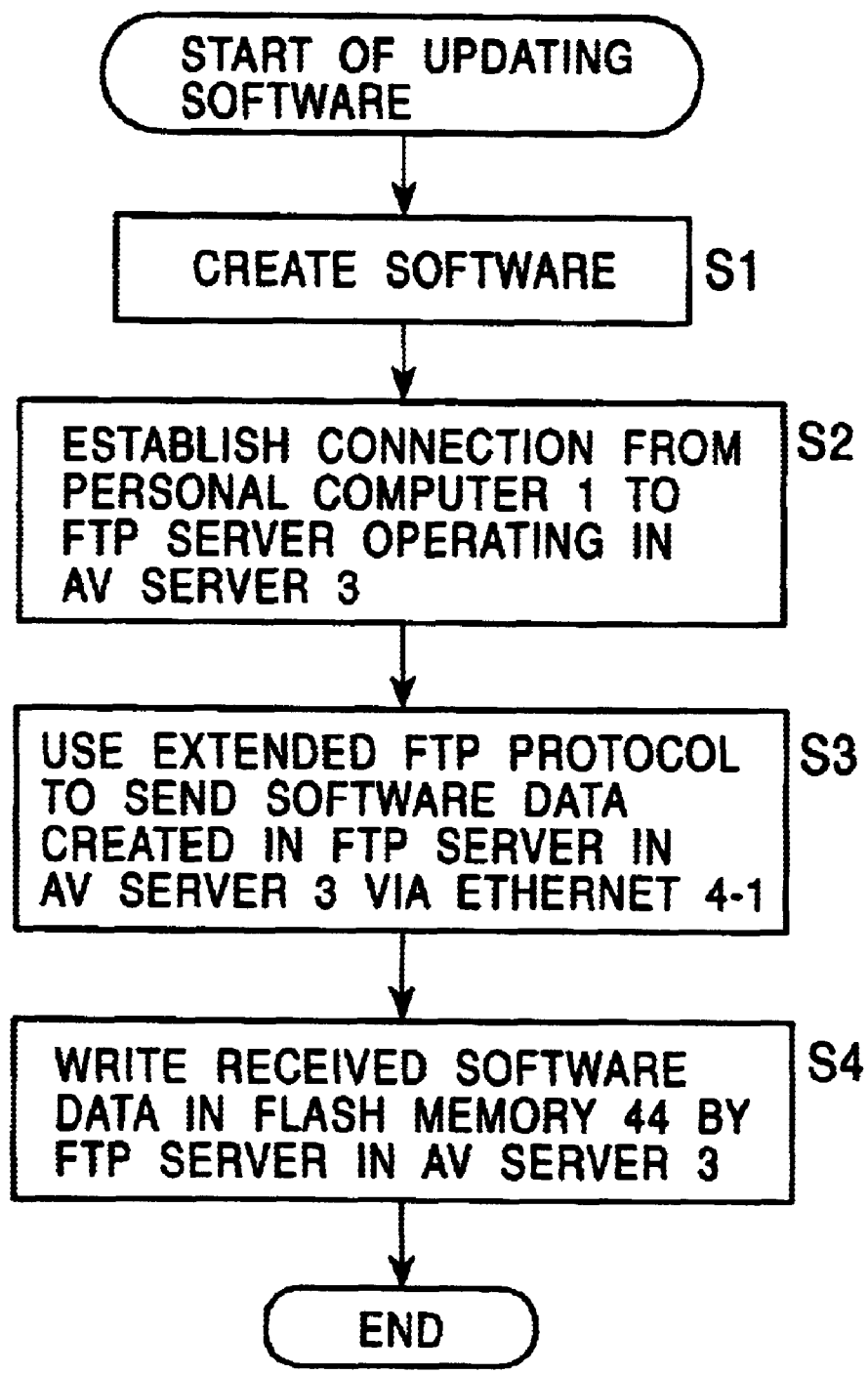
FIG. 6 is a flowchart showing a process for the downloading of software data.

With reference to the flowchart shown in FIG. 6, the downloading of software data is described below.

In step S1, a person who performs updating creates software for updating, and stores the software in the HDD 16 a of the personal computer 1. In step S2, the CPU 11 of the personal computer 1 uses its FTP client function to establish connection with the FTP server of the AV server 3 connected to the personal computer 1 via the Ethernet connection 4-1. In step S3, in accordance with the extended FTP, the FTP client of the personal computer 1 transmits the software data created and stored in the HDD 16 via the Ethernet connection 4-1 to the FTP server of the AV server 3. Step S3 corresponds to process 1 shown in FIG. 5.

In step S4, the FTP server of the AV server 3 writes the received software data in the flash memory 44. Step S4 corresponds to process 2 shown in FIG. 5. By performing steps S1 to S4, the updating of the software of the AV server 3 is completed.

Figure 7:
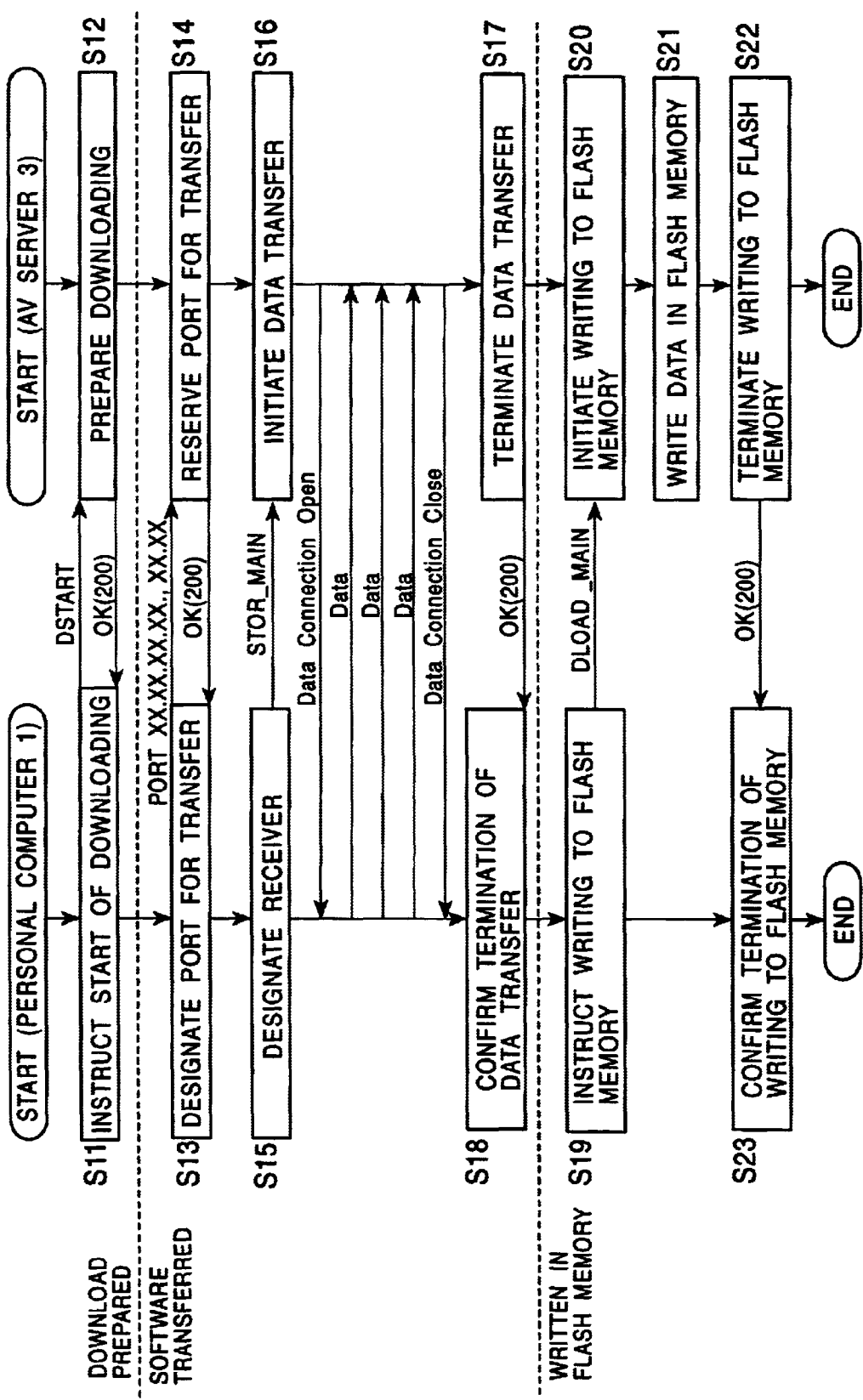
FIG. 7 is a more detailed process for the downloading of software data.

The details of the software data downloading (steps S3 and S4 shown in FIG. 6) is further described below with reference to the flowchart shown in FIG. 7.

In step S11, for preparing downloading, the FTP client of the personal computer 1 instructs the FTP server of the AV server 3 to start downloading. In other words, the FTP client of the personal computer 1 issues a command "DSTART" instructing the preparation of downloading. In step S12, the FTP server of the AV server 3 performs processing for downloading in response to the instruction for starting downloading. When the FTP server of the AV server 3 completes the preparation, it transmits, to the FTP client of the personal computer 1, a signal "OK(200)" representing completion of preparing the start of downloading. By performing steps S11 and S12, the preparation for downloading from the personal computer 1 to the AV server 3 is completed. The command instructing the preparation of downloading is an added command in the extended FTP.

When the FTP client of the personal computer 1 receives the downloading-preparation-completion signal "OK(200)" from the FTP server of the AV server 3 in step S13, it transmits a transfer port number based on the FTP to the FTP server of the AV server 3. In step S14, the FTP server of the AV server 3 transmits a signal "OK" representing completion of reserving a transfer port number to the FTP client of the personal computer 1 when having reserved a transfer port having the received number.

In step S15, the FTP client of the personal computer 1 issues, to the FTP server of the AV server 3, a command "STOR_MAIN" for instructing a destination to which the software data are transferred. In step S16, the FTP server of the AV server 3 opens the transfer port when completing the preparation of receiving the software data, and transmits a signal "Data Connection Open" to the FTP client of the personal computer 1.

When the FTP client of the personal computer 1 receives the signal "Data Connection Open" from the FTP server of the AV server 3, it initiates the transmission of the software data to be downloaded. The FTP server of the AV server 3 sequentially stores the downloaded software data in the RAM 43. When the FTP server of the AV server 3 has received and stored all the software data, it closes the transfer port and transmits a signal "Data Connection Close" to the FTP client of the personal computer 1.

In step S17, the FTP server of the AV server 3 confirms the termination of the software-data transfer, and transmits a data-transfer-termination signal "OK(200)" to the FTP client of the personal computer 1. In step S18, the FTP client of the personal computer 1 confirms the termination of the software-data transfer when receiving the data-transfer-termination signal "OK(200)" from the FTP server of the AV server 3. Steps S11 to S18 correspond to step S3 shown in FIG. 3 and process 1 shown in FIG. 5.

In step S19, the FTP client of the personal computer 1 transmits, to the FTP server of the AV server 3, a signal "DLOAD_MAIN" for instructing the FTP server of the AV server 3 to write the downloaded software data in the flash memory 44. In step S20, the FTP server of the AV server 3 initiates the writing of the downloaded software data temporarily stored in the RAM 43 into the flash memory 44. In step S21, the FTP server of the AV server 3 writes the software data in the flash memory 44. In step S22, the FTP server of the AV server 3 terminates the software-data downloading by transmitting a writing-completion signal "OK(200)" to the FTP client of the personal computer 1 when completing the writing to the flash memory 44.

When receiving the writing-completion signal "OK(200)" from the FTP server of the AV server 3, the FTP client of the personal computer 1 confirms completion of writing the software data into the flash memory 44 of the AV server 3, and terminates the software-data downloading. Steps S19 to S23 correspond to step S4 shown in FIG. 6 and process 2 shown in FIG. 5. The command instructing the FTP server of the AV server 3 to write the transferred software data in the flash memory 44 is an added command in the extended FTP.

Figure 8:
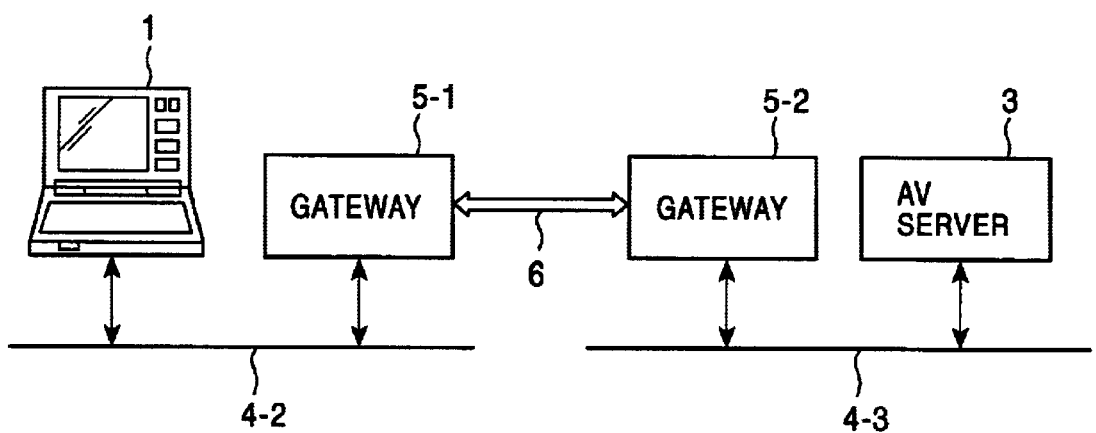
FIG. 8 is a block diagram showing an information processing apparatus according to another embodiment of the present invention.
Figure 9:
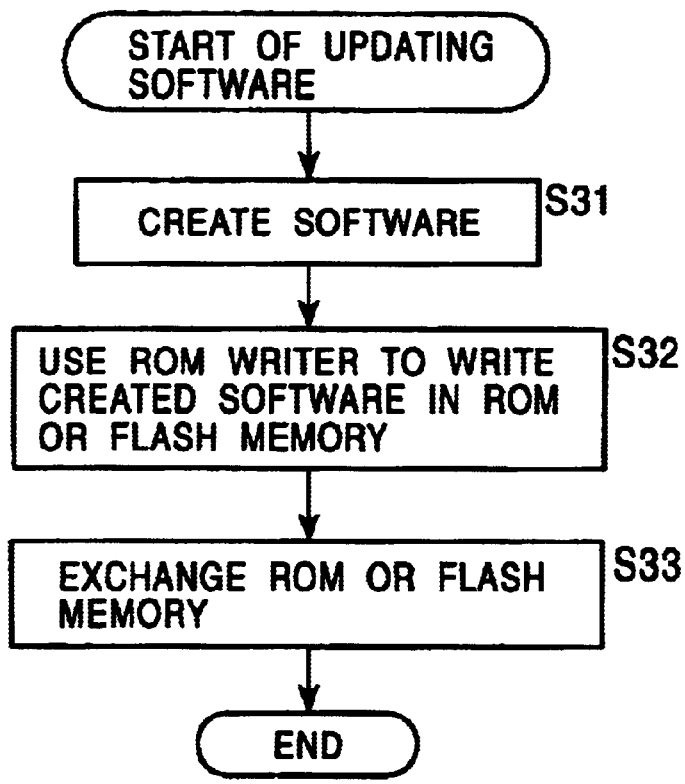
FIG. 9 is a flowchart illustrating a process for updating software by using a conventional ROM writer.
Figure 10:
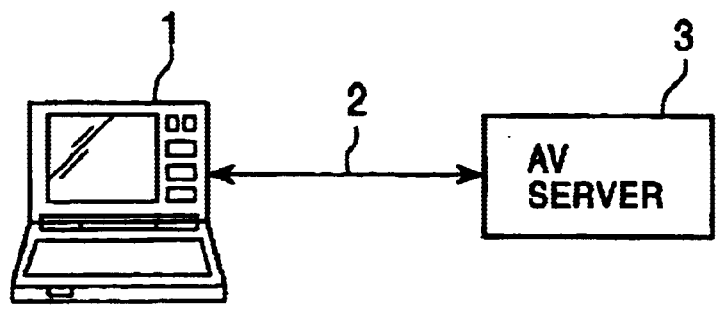
FIG. 10 is a block diagram showing a conventional configuration of updating software in which a personal computer 1 and an AV server 3 are connected by a serial line 2.

FIG. 8 shows an information processing apparatus according to another embodiment of the present invention. A personal computer 1 is connected to an Ethernet connection 4-2. An AV server 3 is connected to an Ethernet connection 4-3. The Ethernet connection 4-2 is connected to a gateway 5-1, and combines via a public network with the Ethernet connection 4-3 connected to a gateway 5-2 to form a wide area network (WAN). In other words, the personal computer 1 can communicate with the AV server 3 via the WAN. Also in this embodiment, software data can be downloaded from the personal computer 1 to the AV server 3 as in the embodiment shown in FIG. 1.

In the present invention, the type of provision medium for providing a user with a computer program executing the foregoing processing includes not only an information recording medium such as a magnetic disk or a compact-disk read-only memory, but also a transmission medium based on a network, such as the Internet or a digital satellite link.

The present invention has been described using the HDD 16 as a provision medium from the AV server 3 to the personal computer 1. However, the present invention may be practiced using semiconductor storage units such as a dynamic random access memory and a flash memory, and disk recording media such as a digital versatile disk and a magnetooptical disk.

As described above, according to the present invention, data of a physically far information processing apparatus can be easily updated without being affected by a firewall.

According to the present invention, if an information processing apparatus is located at a remote place from another information processing apparatus, its data can easily and securely updated without being affected by a firewall.

What is claimed is:

1. An information processing apparatus comprising:
   a data recorder-reproducer comprising:
      a nonlinearly accessible recording medium; and
      a plurality of input/output processing means for recording first data including externally input video and/or audio data on the recording medium by accessing the recording medium in time slots assigned when said first data are input, the input/output processing means processing and outputting reproduced data to the exterior by accessing the recording medium in the time slots; and
   an information controller comprising:
      a first storage means for storing second data controlling said data recorder-reproducer, said information controller connected to said data recorder-reproducer via a communication network; and
      a first control means performs control so that the second data stored in said first storage-means are transferred based on a file transfer protocol to said data recorder-reproducer via said communication network;
   wherein said data recorder-reproducer comprises: a second storage means for storing the second data transferred from said information controller; and a second control means for assigning each time slot to each input/output processing means and for controlling, based on the second data stored in said second storage means, the input/output processing means.

2. An information processing apparatus according to claim 1, wherein said second control means controls each input/output processing means to record the first data on said nonlinearly accessible recording medium, and controls each input/output processing means to reproduce the first data recorded on the recording medium.

3. An information processing apparatus according to claim 1, wherein said nonlinearly accessible recording medium is a redundant array of inexpensive disks in which a plurality of hard disk drives including a plurality of hard disks are arranged in parallel.

4. A data transfer method for an information processing apparatus comprising a data recorder-reproducer for recording and/or reproducing first data including video and/or audio data by accessing a nonlinearly accessible recording medium in time slots to which a plurality of input/output means are assigned, and an information controller for storing second data controlling said data recorder-reproducer, said information controller connected to said data recorder-reproducer via a communication network, said data transfer method comprising:
   a first step for transferring, based on a file transfer protocol, the second data stored in said information controller to said data recorder-reproducer via said communication network;
   a second step for storing the second data transferred in the first step in said data recorder-reproducer; and
   a third step for controlling, based on the second data stored in the second step, each input/output means in said data recorder-reproducer to record/reproduce the first data on/from the recording medium.

5. A data transfer method for an information processing apparatus, according to claim 4, wherein said nonlinearly accessible recording medium is a redundant array of inexpensive disks in which a plurality of hard disk drives including a plurality of hard disks are arranged in parallel.

6. A provision medium containing a computer-readable program to be executed by an information processing apparatus comprising a data recorder-reproducer for recording and/or reproducing first data including video and/or audio data by accessing a nonlinearly accessible recording medium in time slots to which a plurality of input/output means are assigned, and an information controller for storing second data controlling said data recorder-reproducer, said information controller connected to said data recorder-reproducer via a communication network, said computer-readable program comprising:

a first step for transferring, based on a file transfer protocol, the second data stored in said information controller to said data recorder-reproducer via said communication network;

a second step for storing the second data transferred in the first step in said data recorder-reproducer; and a third step for controlling, based on the second data stored in the second step, each input/output means in said data recorder-reproducer to record/reproduce the first data on/from the recording medium.

* * * * *